United States Patent [19]
Huebler et al.

[11] Patent Number: 5,146,061
[45] Date of Patent: Sep. 8, 1992

[54] ELECTRODE FOR AN ELECTRIC DISCHARGE MACHINING APPARATUS

[75] Inventors: James E. Huebler, Brookfield, Ill.; John M. Arnold, Brighton, Mich.; Narayan C. Saha, Lake Villa, Ill.

[73] Assignee: Institute of Gas Technology, Chicago, Ill.

[21] Appl. No.: 772,686

[22] Filed: Oct. 7, 1991

[51] Int. Cl.$^5$ .................. B23H 1/00; B23H 1/04
[52] U.S. Cl. .................. 219/69.15; 219/69.17
[58] Field of Search .............. 219/69.15, 69.16, 69.17, 219/69.2, 69.14, 69.11; 204/129.2, 129.1, 129.5, 129.55, 129.7

[56] References Cited

U.S. PATENT DOCUMENTS

| | | | |
|---|---|---|---|
| 3,058,895 | 10/1962 | Williams | 219/69.15 |
| 3,594,536 | 7/1971 | Holroyd | 219/69.15 |
| 3,873,800 | 3/1975 | Brettrager | 219/69.15 |
| 4,331,170 | 5/1982 | Wendell | 137/15 |
| 4,332,272 | 6/1982 | Wendell | 137/318 |
| 4,536,633 | 8/1985 | Onizuka | 219/69.14 |
| 4,541,447 | 9/1985 | Soumar et al. | 137/15 |
| 4,743,731 | 5/1988 | Seuring et al. | 219/69.15 |
| 4,891,162 | 1/1990 | Schnellmann | 219/69.14 |

FOREIGN PATENT DOCUMENTS

| | | | |
|---|---|---|---|
| 285479 | 12/1990 | Fed. Rep. of Germany | 219/69.11 |
| 63-102835 | 5/1988 | Japan | 219/69.15 |
| 463529 | 4/1975 | U.S.S.R. | 219/69.15 |

Primary Examiner—Geoffrey S. Evans
Attorney, Agent, or Firm—Speckman & Pauley

[57] ABSTRACT

An electrode for an electric discharge machining apparatus comprising a wall which forms a hollow body open on at least one end, the open end having a shape of the opening to be cut in a structural member. The cutting edge of the electrode is formed by the wall at the open end of the electrode and has a contour which is complementary to the surface contour of the side of the structural member facing away from the electrode. The cutting edge has a thickness of about 0.005 inches to about 0.125 inches.

6 Claims, 1 Drawing Sheet

ELECTRODE FOR AN ELECTRIC DISCHARGE MACHINING APPARATUS

BACKGROUND OF THE INVENTION

1. Field of the Invention

This invention relates to an electrode for an electric discharge machining apparatus suitable for the chipless cutting of openings in structural members, in particular, for hot-tapping pipes.

2. Description of the Prior Art

Electric discharge machining is a high precision process used in making machine dyes and other high precision parts. To provide the accuracy required in producing such high precision parts, electric discharge machining removes material at a slow rate. In addition, unlike mechanical cutters which produce large, sharp chips, sharp edges on the structural member being cut, and which apply large torques to the structural member during the cutting process, electric discharge machining produces very small round chips, smooth edges, and applies no torque to the structural member being cut.

As a result, electric discharge machining is of particular interest in applications requiring the hot-tapping of pipes, such as in-situ gas, oil or water pipelines. In such applications, it is desired to minimize the size of particles, generated in the cutting operation, which may fall into the pipe and become lodged in valve and regulator mechanisms, damaging them in the process. Smooth edges on the opening in the pipe are also important to prevent damage to rubber stoppers and similar devices inserted into the opening. It is also important that torque not be applied to the pipe during the cutting process to avoid undue stress upon the pipe.

In the electric discharge machining process, an electrode is brought in close proximity to an electrically conducting work piece creating a gap between the work piece and the electrode. The gap is gently flushed with a dielectric fluid as a pulsed DC voltage is applied across the gap. The dielectric fluid is ionized at a localized spot as a large current (tens of amperes) flows across the gap, vaporizing a portion of the work piece.

U.S. Pat. No. 3,873,800 discloses an electric discharge machining apparatus for enlarging elongated openings or bores in an electrically conductive work piece having an electrode which is rectangular in an end cross section. To produce an axial bore having an irregular end cross section, the electrode is oscillated in a to-and-fro swinging path of travel.

Due to the precision required by most electric discharge machining applications, the cutting process generally requires a substantial amount of time to complete. One method of increasing the speed of electric discharge machining is taught by U.S. Pat. No. 4,891,162 in which an electrical discharge machining fluid, that is, a dielectric fluid, is used, which permits operation at an increased machining speed and results in clean machined surfaces. However, the increases in cutting rates provided by such a dielectric fluid are not sufficient to satisfy the requirements of high productivity in hot-tapping processes.

Due to the generation of a spark during operation of an electric discharge machining apparatus, it is generally thought by those skilled in the art that electric discharge machining is not suitable for use in applications involving highly combustible materials. U.S. Pat. No. 4,536,633 teaches a dielectric fluid for electrical discharge machining having a high flash point and low combustibility which is not easily ionizable for reducing the combustion hazard.

In applications, such as natural gas pipelines, where the explosion hazard is great, the use of electric discharge machining in combination with known hot-tap technology as taught by U.S. Pat. No. 4,331,170, U.S. Pat. No. 4,332,272, and U.S. Pat. No. 4,541,447 has been shown to be an effective and practical method of cutting holes in pipes under pressure.

When hot-tapping pipelines in operation, it is important that the rate of cutting be sufficiently high to provide a high level of productivity. Thus, the cutting speed is a very practical consideration in selecting a cutting process and apparatus.

One of the key elements of an electric discharge machining apparatus is the electrode. It is known that a 6 inch diameter copper tube having a thickness of 0.125 inches when used as an electrode in an electric discharge machining apparatus requires an unacceptably long cutting time of 59 minutes, primarily because the current carrying capability of the electrode, and thus the material removal rate, decreases with electrode thickness. On the other hand, thin electrodes are reputed to vibrate and distort, requiring removal of more material than a thicker electrode, and thus requiring more rather than less time to cut through a structural member.

SUMMARY OF THE INVENTION

It is an object of this invention to provide an electrode for an electric discharge machining apparatus which is suitable for cutting openings in structural members, in particular, for hot-tapping in-situ gas pipes.

It is another object of this invention to provide an electrode for an electric discharge machining apparatus which is able to cut through the wall of a structural member in approximately the same time as known mechanical cutters.

It is yet another object of this invention to provide an electrode for an electric discharge machining apparatus which produces small round chips in the cutting process and generates smooth edges on the wall of the structural member.

It is yet another object of this invention to provide an electrode for an electric discharge machining apparatus which can cut openings of any shape through the walls of structural members.

It is yet another object of this invention to provide an electrode which reduces the amount of dielectric fluid which flows through the wall of the structural member during the cutting process.

It is another object of this invention to provide an electrode for an electric discharge machining apparatus which is constructed of inexpensive materials.

These objects are achieved, in accordance with one embodiment of this invention, by an electrode which comprises at least one wall which forms a hollow body open on at least one end. The open end of the hollow body has the shape of an opening to be cut in the structural member. For example, an electrode suitable for hot-tapping an in-situ gas pipe in accordance with one embodiment of this invention would have an open end with a circular shape, the open end having a diameter equivalent to the internal diameter of the in-situ gas pipe. In accordance with another embodiment of this invention, the open end of the electrode has an oblong shape for cutting holes in in-situ gas pipes and inserting rotary paddle valves and the like.

The cutting edge of the electrode is formed by the electrode wall at the open end of the electrode. In a preferred embodiment of this invention, the cutting edge has a contour which is complementary to the contour of the surface of the side of the structural member to be cut facing away from the side of the structural member on which cutting is initiated. For example, in an embodiment of this invention suitable for cutting an opening in a pipe, the cutting edge has a contour which is complementary to the contour of the inside surface of the pipe. Thus, the cutting edge penetrates the wall of the structural member being cut approximately simultaneously at all points along the cut. In this way, the amount of dielectric fluid entering the pipe or otherwise flowing through the resulting opening in the structural member is reduced.

The cutting edge of the electrode in accordance with one embodiment of this invention has a thickness of about 0.005 inches to about 0.125 inches.

The electrode can be constructed of any electrically conductive material but, in accordance with a preferred embodiment of this invention, is constructed of copper tubing or copper sheet formed into the desired electrode shape. In accordance with another embodiment, copper sheet is wrapped around copper tubing for additional structural support.

It is generally thought by those skilled in the art that an electrode for an electric discharge machining apparatus, in accordance with one embodiment of this invention, having a cutting edge with a thickness of about 0.005 inches to about 0.125 inches, will not function, primarily because the cutting edge is considered to be too thin, resulting in bending or distortion of the electrode and producing an unacceptable cut. Surprisingly and unexpectedly, experimentation with an electrode, in accordance with one embodiment of this invention, has shown that the electrode has the ability to cut through the wall of a structural member, such as a gas pipe, nearly as rapidly as the same diameter mechanical cutter, producing an opening of the desired shape.

These and other objects and features of this invention will be more readily understood and appreciated from the description and drawings contained herein.

DESCRIPTION OF PREFERRED EMBODIMENTS

Figure 1:
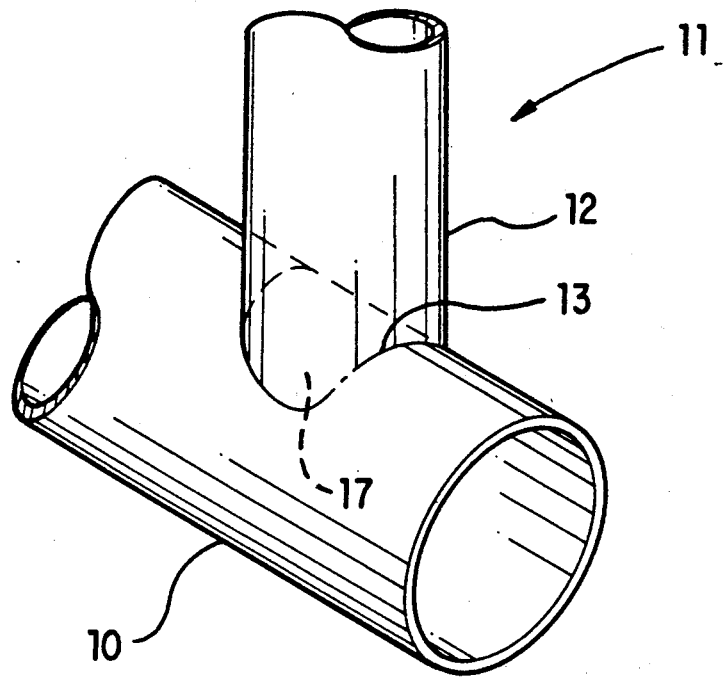
FIG. 1 is a schematic diagram of the invention shown cutting an opening in a tubular member, or pipe.

FIG. 1 is a schematic diagram showing an electrode 11 in accordance with one embodiment of this invention in position to cut an opening in pipe 10. Electrode 11 comprises wall 12 which forms a hollow body having at least one open end 17. The end opposite open end 17 is connected to a servo-control mechanism (not shown) for controlling movement of electrode 11. Disposed at open end 17 of electrode 11 is cutting edge 13 formed by wall 12. As shown, it is an essential feature of this invention that cutting edge 13 have a contour which is complementary to a surface of pipe 10 through which an opening will be cut, preferably an inside surface of pipe 10. Such a complementary contour insures that penetration through the wall of pipe 10 will occur approximately simultaneously at all points along the cut, thereby reducing the amount of dielectric fluid entering into the pipe interior, an important feature.

For example, in cutting an opening in the wall of a pipe, and in particular, in hot-tapping a gas pipe, electrode 12 having a cylindrical shape cuts through less pipe wall thickness at the crown of pipe 10 than further away from the crown. As is well known to those skilled in the art of electric discharge machining, electrode wear increases with the amount of material removed. Providing cutting edge 13 with a contour which is complementary to the contour of the inside surface of pipe 10 produces electrode wear such that cutting edge 13 penetrates the wall of pipe 10 approximately simultaneously at all points along the cut. The same holds true for other structural members as well.

Another critical feature of electrode 11 is the thickness of cutting edge 13. Cutting edge 13 having a thickness greater than about 0.125 inches requires a substantially longer amount of time to cut through the wall of pipe 10 than cutting edge 13 having a thickness between about 0.005 inches to about 0.125 inches, and preferably between about 0.005 inches and 0.035 inches. Such a result would not be anticipated in view of the fact that current flow through an electrode decreases as the cross sectional area, that is, thickness, decreases. Thus, electrode 11 having a cutting edge 13 with a thickness between about 0.005 inches to about 0.125 inches, in accordance with this invention, would be expected to require longer cutting times than electrode 11 having a cutting edge 13 with a thickness greater than 0.125 inches.

Figure 2:
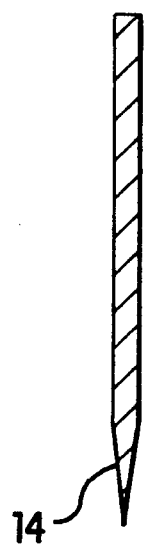
FIG. 2 is a cross sectional view of a cutting edge in accordance with one embodiment of this invention.
Figure 3:
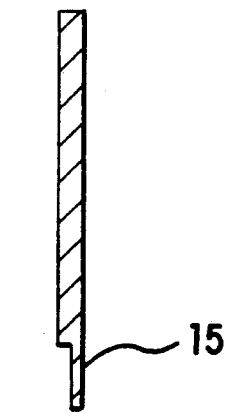
FIG. 3 is a cross sectional view of a cutting edge in accordance with another embodiment of this invention.
Figure 4:
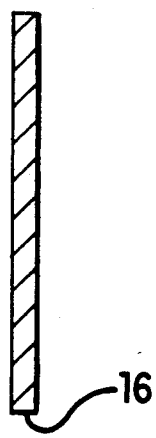
FIG. 4 is a cross sectional view of a cutting edge in accordance with yet another embodiment of this invention.

FIGS. 2 to 4 show different embodiments of cutting edge 13 in accordance with this invention. Generally, electrode 11 need not have a cutting edge 13 with a thickness equivalent to the thickness of wall 12. Thus, electrode 11 may have a tapered cutting edge 14, as shown in FIG. 2, a straight cutting edge 15 extending from wall 12 and having a reduced thickness, as shown in FIG. 3, and uniform cutting edge 16 having a thickness equivalent to the thickness of wall 12, as shown in FIG. 4.

Electrode 11 can be made of any high electrical conductivity material. However, in accordance with a preferred embodiment of this invention, electrode 11 is constructed of copper tubing or copper sheet formed into the desired shape.

It will be apparent to those skilled in the art that the electrode of this invention is suitable for use in cutting openings in electrically conductive structural members.

While in the foregoing specification this invention has been described in relation to certain preferred embodiments thereof, and many details have been set forth for purpose of illustration, it will be apparent to those skilled in the art that this invention is susceptible to additional embodiments and certain of the details described herein can be varied considerably without departing from the principles of the invention.

We claim:

1. In an electric discharge machining apparatus for chipless cutting in hot-tapping pipe having an electrode, electrode control means for controlling a position of said electrode, a dielectric fluid, coupon removal means for holding and removing a pipe coupon, and a power source, the improvement comprising:

- at least one wall of said electrode forming a hollow body open on at least one end, said open end having a shape of an opening to be cut in said pipe;
- a cutting edge of said electrode formed by said wall at said open end of said electrode, said cutting edge having a cutting edge contour which is complementary to an inside surface contour of said pipe; and
- said cutting edge having a thickness of about 0.005 inches to about 0.125 inches.

2. In an electric discharge machining apparatus in accordance with claim 1, wherein said electrode is at least one of copper tubing and copper sheet.

3. In an electric discharge machining apparatus in accordance with claim 1, wherein said cutting edge contour is complementary to said inside surface contour of said pipe whereby said cutting edge penetrates said pipe approximately simultaneously at all points along a cut.

4. In an electric discharge machining apparatus for chipless cutting of openings in a structural member having an electrode, electrode control means for controlling a position of said electrode, a dielectric fluid, and a power source, the improvement comprising:

- at least one wall of said electrode forming a hollow body open on at least one end, said open end having a shape of an opening to be cut in said structural member;
- a cutting edge of said electrode formed by said wall at said open end of said electrode, said cutting edge having a cutting edge contour which is complementary to a surface contour of a surface of said structural member facing away from said electrode; and
- said cutting edge having a thickness of about 0.005 inches to about 0.125 inches.

5. In an electric discharge machining apparatus in accordance with claim 4, wherein said electrode is one of copper tubing and copper sheet.

6. In an electric discharge machining apparatus in accordance with claim 4, wherein said cutting edge contour is complementary to said surface contour said surface of said structural member whereby said cutting edge penetrates said structural member approximately simultaneously at all points along a cut.

* * * * *